United States Patent [19]

Sudderth et al.

[11] Patent Number: 4,563,256

[45] Date of Patent: Jan. 7, 1986

[54] SOLVENT EXTRACTION PROCESS FOR RECOVERY OF ZINC

[75] Inventors: R. Brantley Sudderth; Joseph M. Sierakoski; Roy G. Lewis, all of Tucson, Ariz.

[73] Assignee: Henkel Corporation, Minneapolis, Minn.

[21] Appl. No.: 687,611

[22] Filed: Dec. 31, 1984

[51] Int. Cl.4 .......................... C25C 1/12; C25C 1/16
[52] U.S. Cl. .................................... 204/108; 204/119; 75/101 BE; 75/103; 75/117; 75/120; 423/24; 423/100
[58] Field of Search ............ 423/24, 100; 75/101 BE, 75/103, 117, 120; 204/108, 119, 106–107, 114, 117

[56] References Cited

U.S. PATENT DOCUMENTS

| | | | |
|---|---|---|---|
| 3,428,449 | 2/1969 | Swanson | 75/117 |
| 3,853,981 | 12/1974 | Hadzeriga | 423/24 |
| 3,929,598 | 12/1975 | Stern et al. | 204/108 |

*Primary Examiner*—R. L. Andrews
*Attorney, Agent, or Firm*—Ernest G. Szoke; Patrick J. Span

[57] ABSTRACT

A process for recovery of zinc values from aqueous ammoniacal solutions employing certain alkylsalicylaldoximes or acetophenoximes as the extractant. The method also provides a means for separation of the zinc and copper values present in the aqueous ammoniacal solution. The zinc and copper values are separately recovered from the organic phase by pH controlled stripping.

13 Claims, No Drawings

SOLVENT EXTRACTION PROCESS FOR RECOVERY OF ZINC

The present invention relates generally to a solvent extraction process for recovery of zinc values from aqueous ammoniacal solutions. Further the invention provides a means for the separation of the zinc from copper in the aqueous ammoniacal solution. The results are achieved by extraction of zinc values from aqueous ammoniacal solutions using a water immiscible organic solvent containing certain alkyl salicylaldoximes or acetophenoximes and recovering the zinc from the organic phase with pH controlled stripping.

BACKGROUND OF THE INVENTION

Ammoniacal leaching of materials to provide ammoniacal solutions containing zinc metal values are well known and recognized by those skilled in the art. Where copper is present along with the zinc, both copper and zinc dissolve quite readily in aqueous ammoniacal solutions and in the past difficulty has been encountered in producing separate substantially pure copper and zinc products from a leach solution. A discussion of this area can be found in U.S. Pat. No. 3,929,598 which discussion is incorporated herein by reference.

U.S. Pat. No. 3,853,981 also discusses ammoniacal feed solutions. In this patent the aqueous ammoniacal solution is first treated with an extractant selective to the copper. The extractants are certain benzophenoxime types. Three stages of extraction are suggested and the pregnant organic containing the copper is then sent to a sulfuric acid strip from which the aqueous copper solution is used in an electrolyzing step with the barren organic being recycled to the extraction stage. The aqueous raffinate from the extraction stage is sent to a recovery circuit for the second metal which is disclosed as either an extraction with di-2-ethylhexylphosphoric acid (DEHPA), or by precipitation by the addition of carbon dioxide or by boiling off ammonia procedures all well known to the art.

Generally, in recovery of metals by solvent extraction, the aqueous feed solution is mixed in tanks with an extraction reagent which is dissolved in an organic solvent such as kerosene. The reagent is one which forms a metal-extractant complex with the metal ions in the aqueous solution. This step of forming the complex is called the extraction or loading stage of the solvent extraction process.

The outlet of the mixer continuously feeds to a large settling tank where the organic solvent (organic phase) now containing the metal-extractant complex in solution, is separated from the depleted aqueous solution (aqueous phase). This part of the process is called phase separation. Usually the process of extraction is repeated through two or more mixer-settler stages, in order to more completely extract the desired metal.

After extraction, the depleted aqueous feed stock (raffinate) is either discharged or recirculated for further leaching. The loaded organic phase containing the dissolved metal-extractant complex is fed to another set of mixer tanks where it is mixed with an aqueous strip solution of concentrated sulfuric acid. The highly acid strip solution breaks apart the metal-extractant complex and permits the purified and concentrated metal value to pass to the strip aqueous phase. As in the extraction process described above the mixture is fed to another settler tank for phase separation. This process of breaking the metal extractant complex is called the stripping stage, and the stripping operation is usually repeated through two or more mixer settler stages to more completely strip the metal from the organic phase.

From the stripping settler tank, the regenerated strip organic phase is recycled to the extraction mixers to begin extraction again, and the strip aqueous phase is customarily fed to an electrowinning tank house where the metal values are deposited on plates by a process of electrodeposition. After electrowinning, the metal values from the aqueous solution, the solution known as spent electrolyte, is returned to the stripping mixtures to begin stripping again. In many of the commercially available extractants, there is usually found kinetic additives or modifiers of extraction and stripping equilibrium.

Kinetic additives are chemical substances included in solvent extraction reagents for the purpose of increasing the rate of transfer of metal values between organic and aqueous phases without materially affecting the position of equilibrium. Kinetic additives function to alter transfer rates in a variety of ways which are not as yet completely understood. Modifiers of extraction and stripping equilibrium are frequently incorporated in commercial reagents which include the so called "strong" extractants. Such extractants are capable of forming very stable complex association with metal values and consequently require the use of highly acidic aqueous stripping solutions in order to affect the breakdown of the extractant complex. Where extreme acidity of stripping solutions generates problems in employing conventional eletrodeposition processes, modifiers are incorporated to shift equilibrium in a manner facilitating stripping at lower acidities and to enhance metal extraction efficiency.

The use of kinetic additives or equilibrium modifiers has not been without drawbacks in the overall efficiency of solvent extraction processes in terms of the long range stability of reagents and sensitivity of reagents to contaminants and aqueous feed stocks. Additionally, equilibrium modifiers, particulary when entrained in aqueous have been noted to have severe deleterious effects on structural components of solvent extraction facility such as rubber linings, fittings, valves and the like. In addition, leach solutions containing dissolved silica or suspended solids frequently tend to form emulsions with active metal extractants and their diluents and the sensitivity of reagents to silica has been noted to be enhanced by the presence of equilibrium modifiers. Thus, kinetic and equilibrium modifying additives appear to have adverse effects on solvent extraction systems in terms of what is commonly referred as "crud formation". This "crud", if allowed to build uncontrollably, will eventually interfere with the solvent extraction process. The buildup of crud is normally controlled by mechanical means which may involve a shut down of the plant and subsequent loss of production. It is accordingly desirable to avoid the need of kinetic additives and/or equilibrium modifiers.

There continues to exist, therefore, a general need in the art for reagents for solvent extraction processes for the recovery of zinc values which display efficient kinetic and equilibrium characteristics but which include either no, or minimal, quantities of kinetic additives and/or equilibrium modifiers.

BRIEF SUMMARY OF THE INVENTION

The present invention provides an improved process for the recovery of zinc values by solvent extraction processing by the use of certain alkylsalicylaldoxime or acetophenoxime reagents. The invention also provides a means for separation of the zinc and any copper values associated therewith from ammoniacal aqueous solutions. The efficient zinc recovery is achieved by these aldoxime reagents without the need of kinetic and/or equilibrium modifier additives.

Generally stated, the invention deals with a process for recovering an extractable metal value from an aqueous ammoniacal solution containing said metal value in which said process comprises contacting the aqueous ammoniacal solution with a water-immiscible solvent containing an extractant for said metal value to provide an organic phase containing the metal values, separating the organic phase from the aqueous raffinate solution depleted in the metal value, and recovering the metal value from the organic extractant. The improvement in the process comprises employing certain alkylsalicylaldoximes or acetophenoximes as the extractant.

These oximes can be represented by the formula:

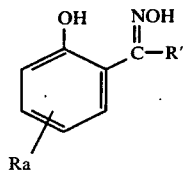

wherein R is a saturated aliphatic group of 1–25 carbon atoms or an ethylenically unsaturated aliphatic group of 3–25 carbon atoms, or —OR" where R" is a saturated ethylenically unsaturated group as defined. a is an integer of 0, 1, 2, 3 or 4, and R' is hydrogen or a saturated aliphatic group of 1–25 carbon atoms or an ethylenically unsaturated aliphatic group of 3–25 carbon atoms with the proviso that the total number of carbon atoms R and R' is from 3–25.

Preferred compounds of the formula are those in which a is 1, R is a straight or branched alkyl group having from 7–12 carbon atoms, and R is attached in a position para to the hydroxyl group and R' is hydrogen or methyl.

DETAILED DESCRIPTION OF THE INVENTION

According to the present invention, a process is therefore provided for extraction and recovery of zinc values from metal or aqueous ammoniacal solutions containing zinc metal values. Where copper values are associated with the zinc in the ammoniacal aqueous solution, the invention also provides for separation of the zinc from the copper values.

Generally, the method involves the conventional steps found in a liquid ion exchange extractant process which generally involve contacting the aqueous solution containing the metal values with a water-immiscible solvent containing the extractant. The metal values being extracted in the organic solvent after which the organic and aqueous phases are separated. After separation of the two phases the now pregnant organic phase is sent to a stripping circuit wherein the metal value is stripped from the aqueous solution. If only zinc is present, the zinc is stripped from the organic and the now barren organic is returned to the extraction circuit.

Where copper is present along with the zinc it is co-extracted with the zinc in the extraction circuit. After the selective zinc stripping, the zinc barren, but copper rich organic is sent to a copper stripping circuit wherein the organic is again contacted with a stripping acid and the copper removed. The barren organic is then sent to the extraction circuit and the aqueous solution containing copper is sent to electrowinning to recover the copper. The zinc rich aqueous solution from the first stripping step can then be used as an electrolyte in electrowinning to plate the zinc into cathode or the electrolyte can be sent to a crystallization step for recovery of zinc as a pure zinc salt.

Generally, the flow of organic is counter-current to the aqueous in the extraction or stripping stages of the process. While reference has been made to the extraction circuit and the stripping circuits, these extraction and stripping steps are conducted generally in more than one stage. In the present invention the extraction is usually carried out in two stages and each stripping circuit usually consists of two stages of stripping.

The typical procedure employed herein in more detail is described as follows. The organic and aqueous zinc ammoniacal solutions are contacted in a conventional extraction mixer for a nominal period of about 2 minutes. In this first stage of extraction, a major portion of the zinc is chemically extracted into the organic phase. This is then discharged into a conventional solvent extractant settler where the phases are allowed to separate. The aqueous is advanced to a second stage extraction mixer where the process is repeated and more zinc is extracted into the organic phase. The zinc poor aqueous or raffinate is normally recycled back to the leaching stage to solubilize more zinc. The organic phase contains the extracted zinc and some ammonia. The zinc loaded organic from the first stage extraction is sent to a pH controlled washing stage where it is contacted in a solvent extraction mixture with dilute acid to selectively remove the ammonia from the organic phase. The pH is controlled in the range of about 6.5–7.0. The emulsion is again discharged from the mixer to a conventional solvent extraction settler from which the aqueous is recycled back to a mixer with a small amount bled off that equals the amount required to strip the ammonia. The ammonia free or washed organic is then sent to the stripping portion of the overall circuit. The stripping circuit also consists of two stages of mixer settlers. The aqueous used in the stripping stage is normally a mineral acid such as sulfuric or hydrochloric depending on the final product that is desired. The zinc is stripped from the organic at a pH of less than 3.5. The zinc concentration in the aqueous is brought to the desired level by recycling the aqueous phase. The zinc aqueous from stripping is suitable for use as electrolyte in electrowinning to plate the zinc into cathode or the electrolyte can be sent to a crystallization step for recovery as a pure zinc salt. The zinc depleted electrolyte is then recycled back to stripping to remove more zinc from the organic phase. The barren or stripped organic is then returned to the second stage of extraction to repeat the entire process. The flow of organic is counter current to the aqueous flows in all stages of the process.

When copper is present together with zinc in the ammoniacal leach solution it is co-extracted with the zinc by the oxime extractant in the extraction portion of the circuit. The loaded organic containing the copper zinc and ammonia is processed as described previously above to remove the ammonia in the washing stage. The ammonia free organic is then sent to two stages of zinc stripping for removal of the zinc. The zinc stripping stages are maintained with pH controllers in the range pH 1.5-3.5 to selectively strip the zinc but leave the copper loaded on the organic phase. The organic is then sent to two stages of copper stripping using an aqueous solution that contains 180-200 g/l free acid (much less than 1.5 i.e. near 0) to effectively strip the copper. The aqueous copper in the stripping stages is suitable for use as electrolyte for electrowinning or for feed to crystallization. The spent copper electrolyte is then recycled back to the copper stripping circuit to remove more copper from the organic phase. The stripped or barren organic is then returned to the extraction portion of the circuit to repeat the entire process.

The extractants which find use in the present invention are those of the formula noted earlier, wherein R, a and R' are defined as previously noted above. In the examples which follow below, the preferred aldoxime which is employed therein is one in which R is dodecyl and in the para position to the hydroxyl group, a is an integer 1 and R' is hydrogen. Another particularly desirable salicyladoxime is one having the same structure wherein R is nonyl, particularly a mixture of isomers, in place of the dodecyl group. Another particularly desirable compound is one in which R is either the nonyl or the dodecyl group and a is an integer of 1 and R' is a methyl group. Accordingly, the preferred compositions are 5-dodecylsalicylaldoxime, 5-nonylsalicylaldoxime, 5-nonyl-2-hydroxyacetophenoxime and 5-dodecyl-2-hydroxyacetophenoxime.

The foregoing extractants are generally considered "strong" extractants requiring the addition of equilibrium modifiers when employed in circuits using acidic feed solutions. In the present invention with the use of the aqueous ammoniacal solutions, it is generally not necessary to employ any kinetic and/or equilibrium modifiers with these extractants. If any of these are found necessary for any specific reagent or for any specific leach liquor found requiring them, they should be used in minimal amounts. Thermodynamic modifiers that are commonly used with salicylaldoximes are the alkylphenols and the alkanols, in which the alkyl group would generally contain from 7-16 carbon atoms. The ones most commonly used would be nonylphenol, dodecylphenol, octylphenol, dodecanol and tridecanol. The disadvantage in employing such modifiers is that these tend to solubilize ammonia in the organic phase and accordingly are detrimental on a unit cost basis due to neutralization makeup and possible contamination of a final product.

As indicated earlier the extractant is dissolved in a water-immiscible solvent. A wide variety of water-immiscible organic solvents in which the extraction reagents are dissolved can be employed according to this invention. The minimum requirements for such solvents are that they be substantially water-immiscible, that the solvent will dissolve the extraction reagent and that it will not interfere with the function of the reagent in extracting the metal values from the acids from the aqueous ammoniacal solutions. The metal complex formed with the extractant also must be soluble in the solvent. It is generally required that at least 2% by weight of the extractant or the metal complex thereof be soluble in the essentially water-immiscible solvent. Such solvents include: aliphatic and aromatic hydrocarbons such as kerosenes, benzene, toluene, xylene and the like. The choice of the essentially water-immiscible liquid hydrocarbon solvent for commercial operations will depend on the number of factors including the design of the solvent extraction plant (i.e. mixer-settlers Podbielniak extractors, etc.), the value of the metal being recovered, disposal of plant effluent and the like. Essentially, in operation, the plants would use mixer-settlers of relatively large organic inventories and some loss of solvent invariably occurs by evaporation, entrainment in the aqueous and the like. Under the circumstances preferred solvents for use in the metal recovery process of the present invention are aliphatic and aromatic hydrocarbons having flash points of 150° F. and higher and solubilities in water of less than 0.1% by weight. These solvents are also essentially non-toxic and chemically inert and the costs thereof are currently within practical ranges. Representative commercially available solvents are Kermac 470 B, 500T (both an aliphatic kerosene available from Kerr-McGee flash point 175° F.), Chevron Ion Exchange Solvent (available from Standard oil of California flash point 195° F.), Escaid 100 and 110 (available from Exxon—Europe—flash point about 180° F.), Norpar 12 (available from Exxon U.S.A.—flash point 160° F.), Conoco C-1214 (available from Conoco—flash point 160° F.), Aromatic 150 (an aromatic kerosene available from Exxon U.S.A.—flash point 150° F.), and other various kerosenes and petroleum fractions available from the oil companies.

To further illustrate the various objects and advantages of the present invention, the following examples are provided. It is understood that their purpose is entirely illustrative and in no way intended to limit the scope of the invention. In these examples, the procedure described earlier above employing the circuits as described which employed two extraction stages, two scrubs or wash stages and two strip stages.

EXAMPLE 1

In this example the organic extractant employed consisted of 10 v/v % of 5-dodecylsalicylaldoxime and 90 v/v % of a kerosene (Kermac 500T). The feed solution was made up to contain 24.06 g/l Zn, 27.4 g/l $NH^3$, 25.8 g/l $CO_2$, but the average Zn value in the circuit was 20.76 g/l.

The circuit was operated following the typical procedure discussed earlier for four days using the concentration of extractant diluted with the aliphatic kerosene as noted. During the first two days of the circuit, the aqueous from scrub stage 2 to scrub stage 1 was not advanced. The data below was gathered from the last two days of the circuit run.

The average organic to aqueous ratio (O/A) in extraction was 8.76:1. The zinc transfer on the organic was 2.27 g/l. The loaded organic that was advanced from extraction to the scrub stage had a hazy appearance that was probably due to aqueous entrainment. On the average, 95.86% of the zinc was recovered. The average value for the raffinate was 0.90 g/l.

Both scrub stages were pH controlled. The pH of the first scrub stage was maintained between 6.5 and 7.0. The pH of the second scrub stage was around 6.5±0.2. The average amount of zinc lost in the scrub raffinate was 0.09 g/l. A 50 g/l sulfuric acid solution was used for pH control.

The strip section consisted of two stages. The average concentration of zinc in the pregnant electrolyte was 46.51 g/l.

EXAMPLE 2

In this example the circuit was in operation for two days. Two extraction, two scrub and two strip stages were employed. The organic extractant solvent composition was 10 v/v % of the same extractant employed in Example 1 and 50 v/v % Exxon Aromatic 150+40 v/v % Kermac 500T as the kerosene solvent. The feed solution was made with approximately 20 g/l zinc, 40 g/l $NH_3$, 10 g/l $(NH_4)_2CO_3$. The pH of the solution was 10.3. In the circuit the average feed value was 19.7 g/l zinc.

In the operation of the circuit the average O/A ratio in extraction was 9.32:1. The net transfer of zinc by the organic was 2.14 g/l. Over 98% of the zinc was recovered and the raffinate averaged 0.26 g/l the second day. The pH's in the scrub stages in this circuit were maintained at the same pH's as in the other two circuits. An average of 0.056 g/l zinc was in the raffinate in the scrub stage. Once again, 50 g/l $H_2SO_4$ was used as the scrub acid solution.

The average amount of zinc detected in the pregnant electrolyte was 43.7 g/l. The strip solution for this circuit was also 100 g/l $H_2SO_4$.

EXAMPLE 3

In this example, a high copper and high zinc aqueous feed solution was used. The organic extractant solvent composition was 30% v/v % of the same extractant and 70% Exxon Aromatic 150. The solution was made up to contain approximately 15 g/l Cu, 10 g/l Zn, and 40 g/l $NH_3$ at a pH of 10.6. The averages of the values in operation were 9.14 g/l Zn and 12.02 g/l Cu.

The circuit was operated for three days using the process as described earlier where both zinc and copper were contained in the aqueous feed solution. The O/A ratio in extraction was 3.75:1 for the majority of the day on which the data is reported. At this O/A, the recovery of the copper was greater than 99% and zinc recovery on the average was slightly greater than 94%. The average net transfer of zinc was 2.18 g/l and copper averaged 2.65 g/l. The raffinate contained 4 ppm of copper and 0.54 g/l zinc.

No copper was detected in the ammonia scrub raffinate while 0.12 g/l zinc was detected. The pH in the first scrub stage was maintained between 6.8 and 7.2. The pH of the second stage was controlled between 6.3 and 6.7. 50 g/l $H_2SO_4$ was used as the scrub solution.

A copper free zinc pregnant electrolyte was not achieved in the circuit which appeared to be due to the slow response of pH electrodes (which may have been effected by the aromatic kerosene). With control of the pH between 3.2 and 3.5 in the first zinc strip stage, a copper value of less than 10 ppm would result. A pH of 1.5-2.0 in the second zinc strip stage should ensure that 98-99% of the zinc would be removed from the organic. 100 g/l acid was used for pH controlling in this section and the electrolyte contained 58.2 g/l zinc on the average.

Copper stripping was easily achieved with 200 g/l sulfuric acid. The pregnant electrolyte contained 38.35 g/l copper. A very low flow would build a pregnant containing 50 g/l copper. The copper pregnant electrolyte contained approximately 0.50 g/l zinc.

EXAMPLE 4

In this example, a low copper and low zinc feed solution was employed. The organic contained 30 v/v % of the extractant employed in Example 1 with 70 v/v % Exxon 150 Aromatic kerosene. The average values for the solution was 8.32 g/l copper, 6.7 g/l zinc and 30 g/l $NH_3$ with a pH of 10.2.

The circuit was operated in the same procedure as earlier described for a period of 5 days. The average O/A ratio in extraction was 3.59:1. The overall recovery of both metals was greater than 99%. Copper was rarely detected in the raffinate (0.001 g/l) and the Zn was 0.05 g/l. The zinc and copper transfer in the organic was 2.02 g/l and 2.34 g/l respectively.

The average amount of copper leaving the first ammonia scrub stage was 0.001 g/l while 0.12 g/l zinc left the system. The pH in the first scrub stage was maintained between 6.8 and 7.2. The second scrub stage was operated at a pH range of 6.3 to 6.7. 50 g/l $H_2SO_4$ was used as a scrub solution. An average of 57.6 g/l Zn and 0.008 g/l Cu were found in the zinc pregnant electrolyte. When the pH in the first zinc strip stage was lowered from 3.2 to 2.5, a slight decrease in the back extracting of copper was observed. When a pH range of 3.2 to 3.5 was maintained less than 10 ppm of copper was found in the pregnant solution. The pH in the second strip stage fluctuated between 1.0 and 2.0 on one of the days.

The copper pregnant electrolyte contained an average of 37.1 g/l copper and 0.94 g/l zinc.

What is claimed is:

1. In a process for recovering zinc values from an aqueous ammoniacal solution containing said zinc values in which said process comprises contacting said aqueous ammoniacal solution with an extractant contained in a water-immiscible solvent for said extractant to provide an organic phase of the solvent containing the extracted zinc values, separating the organic phase from the aqueous raffinate depleted in the zinc values and recovering said zinc value from said organic extract, the improvement which comprises using as said extractant an oxime of the formula:

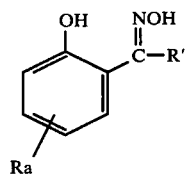

wherein R is a saturated aliphatic group of 1-25 carbon atoms or an ethylenically unsaturated aliphatic group of 3-25 carbon atoms, or —OR" where R" is a saturated ethylenically unsaturated group as defined. a is an integer of 0, 1, 2, 3 or 4, and R' is hydrogen or a saturated aliphatic group of 1-25 carbon atoms or an ethylenically unsaturated aliphatic group of 3-25 carbon atoms with the proviso that the total number of carbon atoms in R and R' is from 3-25.

2. A process as defined in claim 1 in which said oxime is selected from the group consisting of 5-dodecylsalicylaldoxime, 5-nonylsalicylaldoxime, 5-nonyl-2-hydroxy-acetophenoxime and 5-dodecyl-2-hydroxy acetophenoxime.

3. A process defined in claim 1 in which said water-immiscible solvent is an aliphatic or aromatic hydrocarbon having a flash point of at least 150° F.

4. A process as defined in claim 3 in which said solvent is kerosene.

5. A process as defined in claim 1 in which said aqueous ammoniacal solution containing said zinc value further contains copper values which are also extracted into said organic phase.

6. A process as defined in claim 5 wherein the organic phase containing said copper and zinc values is separated from the aqueous ammoniacal raffinate and said organic phase is contacted with a mineral acid at a pH of 1.5–3.5 to selectively strip said zinc values from said organic phase containing copper values, providing an aqueous acid raffinate phase containing the zinc values and after separating the organic and aqueous phases recovering said zinc values from said aqueous acid solution.

7. A process as defined in claim 6 in which said mineral acid is sulfuric acid.

8. A process as defined in claim 6 in which said organic phase containing said copper values depleted of zinc values, is contacted with a mineral acid at a pH less than 1.5 thereby stripping said copper values from said organic phase and to an aqueous acid phase and recovering said copper values from said aqueous acid solution.

9. A process as defined in claim 8 in which said mineral acid for stripping said copper values from said organic phase is sulfuric acid.

10. A process for separating and recovering zinc and copper values from an aqueous ammoniacal solution containing said values, said process comprising:
 (a) contacting said aqueous ammoniacal solution containing said zinc and copper values with an organic extractant in a water-immiscible organic solvent thereby providing an organic phase containing said extracted zinc and copper values and an aqueous ammoniacal raffinate, said organic extractant comprising an oxime of the formula:

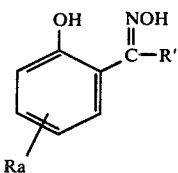

wherein R is a saturated aliphatic group of 1–25 carbon atoms or an ethylenically unsaturated aliphatic group of 3–25 carbon atoms, or —OR" where R" is a saturated ethylenically unsaturated group as defined. A is an integer of 0, 1, 2, 3 or 4, and R' is hydrogen or a saturated aliphatic group of 1–25 carbon atoms or an ethylenically unsaturated aliphatic group of 3–25 carbon atoms with the proviso that the total number of carbon atoms in R and R' is from 3–25;
 (b) after separating said organic phase from said aqueous raffinate contacting said organic phase with an inorganic mineral acid at a controlled pH of 1.5–3.5 thereby stripping said zinc values from said organic phase and providing an organic phase containing said copper values and an aqueous acid phase containing said zinc values;
 (c) contacting said organic phase containing said copper values with an inorganic mineral acid at a pH substantially below 1.5, thereby stripping said copper values from said organic phase providing an aqueous acid phase containing said copper values; and
 (d) recovering said zinc values from said aqueous acid phase of step (b) above and recovering said copper values from said aqueous acid phase in step (c) above.

11. A process as defined in claim 10 in which said oxime is selected from the group consisting of 5-dodecylsalicylaldoxime, 5-nonylsalicylaldoxime, 5-nonyl-2-hydroxy-acetophenoxime and 5-dodecyl-2-hydroxy-acetophenoxime.

12. A process as defined in claim 10 in which said zinc is recovered from said aqueous acid solution by electrowinning.

13. A process as defined in claim 10 wherein said copper values in said aqueous acid solution is recovered by electrowinning.

* * * * *